US012517043B2

(12) United States Patent
Herault et al.

(10) Patent No.: US 12,517,043 B2
(45) Date of Patent: Jan. 6, 2026

(54) PROGNOSIS METHOD FOR BLOOD DISORDERS

(71) Applicants: CENTRE NATIONAL DE LA RECHERCHE SCIENTIFIQUE, Paris (FR); CENTRE HOSPITALIER REGIONAL UNIVERSITAIRE DE TOURS, Tours (FR); UNIVERSITÉ DE TOURS, Tours (FR)

(72) Inventors: Olivier Herault, La Tremblaye (FR); Olivier Sire, Meucon (FR)

(73) Assignees: CENTRE NATIONAL DE LA RECHERCHE SCIENTIFIQUE, Paris (FR); CENTRE HOSPITALIER REGIONAL UNIVERSITAIRE DE TOURS, Tours (FR); UNIVERSITÉ DE TOURS, Tours (FR)

( * ) Notice: Subject to any disclaimer, the term of this patent is extended or adjusted under 35 U.S.C. 154(b) by 577 days.

(21) Appl. No.: 17/927,480

(22) PCT Filed: May 24, 2021

(86) PCT No.: PCT/EP2021/063762
§ 371 (c)(1),
(2) Date: Nov. 23, 2022

(87) PCT Pub. No.: WO2021/239665
PCT Pub. Date: Dec. 2, 2021

(65) Prior Publication Data
US 2023/0236122 A1    Jul. 27, 2023

(30) Foreign Application Priority Data
May 25, 2020    (FR) ...................................... 2005494

(51) Int. Cl.
*G01N 21/3577*    (2014.01)
*G01N 21/35*    (2014.01)
(Continued)

(52) U.S. Cl.
CPC .  *G01N 21/3577* (2013.01); *G01N 2021/3595* (2013.01); *G01N 2021/451* (2013.01); *G01N 21/552* (2013.01); *G01N 2201/129* (2013.01)

(58) Field of Classification Search
CPC ............. G01N 21/3577; G01N 21/552; G01N 2021/3595; G01N 2021/451; G01N 2201/129
See application file for complete search history.

(56) References Cited

U.S. PATENT DOCUMENTS

2013/0137134 A1    5/2013  Mordechai et al.

FOREIGN PATENT DOCUMENTS

WO    2011121588 A1    10/2011

OTHER PUBLICATIONS

Le Corvec, "Mid-infrared spectroscopy of serum, a promising non-invasive method to assess prognosis in patients with ascites and cirrhosis" PLoS ONE, Oct. 11, 2017, 12(10): pp. 1-15. (Year: 2017).*

(Continued)

*Primary Examiner* — Dennis White
(74) *Attorney, Agent, or Firm* — Maier & Maier, PLLC

(57) ABSTRACT

A method for determining the risk of developing a blood disorder, which includes the steps of: exposing a biological sample from an individual to radiation to obtain a spectrum characteristic of the sample, the spectrum being processed in order to obtain a spectral signature; comparing the spectral signature obtained with one or more reference spectral signatures; and concluding, if the spectral signature of the individual is significantly different from control spectral (Continued)

signatures, that the individual is likely to develop a blood disorder, and, if not, that the individual is not likely to develop a blood disorder.

6 Claims, 1 Drawing Sheet

(51) Int. Cl.
*G01N 21/45* (2006.01)
*G01N 21/552* (2014.01)

(56) References Cited

OTHER PUBLICATIONS

Sheng et al, "Distinction of leukemia patients and healthy persons serum using FTIR spectroscopy", Spectrochimica Acta Part A: Molecular and Biomolecular Spectroscopy 101 (2013) 228-232 (Year: 2013).*

International Search Report mailed Sep. 10, 2021, in corresponding International Application No. PCT/EP2021/063762; 7 pages (including English Translation).

Le Corvec Maëna et al.; "Mid-infrared spectroscopy of serum, a promising non-invasive method to assess prognosis in patients with ascites and cirrhosis"; PLOS One; vol. 12; No. 10; Oct. 11, 2017; XP055772274; 15 pages.

Sheng Daping et al.; "Distinction of leukemia patients' and healthy persons' serum using FTIR spectroscopy"; Spectrochimica Acta Part A: Molecular and Biomolecular Spectroscopy; ELSEVIER, Jan. 15, 2013; vol. 101; XP055772773; pp. 228-232.

Babrah Jaspreet et al.; "FT-infrared spectroscopic studies of lymphoma, lymphoid, and myeloid leukemia cell lines"; SPIE Proceedings US; vol. 6628; European Conferences on Biomedical Optics; Jul. 19, 2007; XP055772606; 9 pages.

* cited by examiner

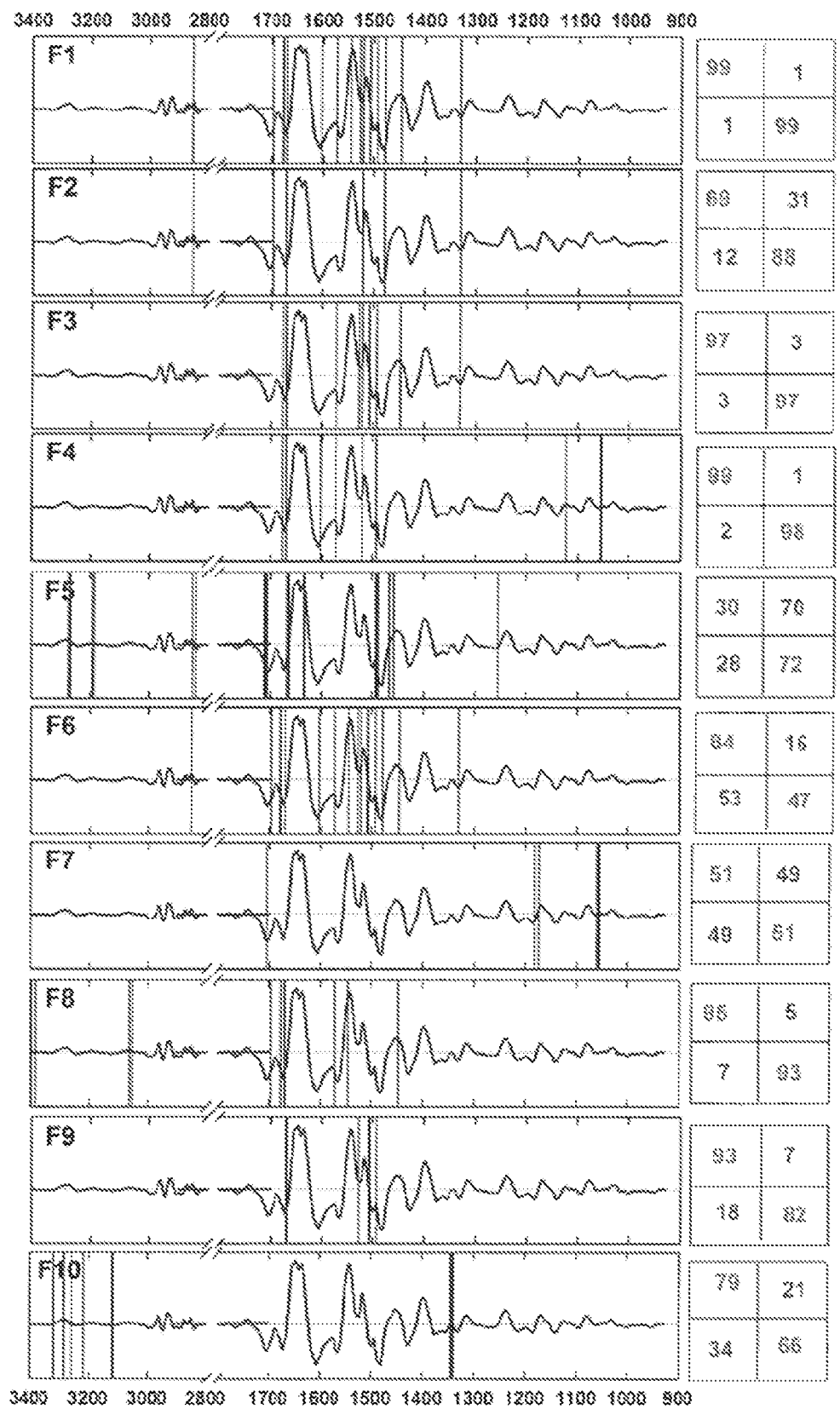

PROGNOSIS METHOD FOR BLOOD DISORDERS

FIELD

The invention relates to a prognosis method for blood disorders.

The field of blood diseases generally requires early screening, diagnosis, and tracking of the development of the disease towards a more serious state, and involves an analysis which can be carried out on a specific biological sample, which generally adds up to a plurality of blood tests.

BACKGROUND

The myelodysplastic syndromes (MDS) are pre-leukemic states, the frequency of which increases with the aging of the population, and which exhibits a progressive development with transformation into secondary acute leukemia in 30% of cases. Their diagnosis requires sampling of bone marrow in order to perform a cytological analysis by a biologist specialized in hematology (myelogram).

Such analyses are invasive, long and costly, and it is important to be able to simplify the analyses and to obtain more rapid results.

The Fourier transform infrared (FTIR) spectroscopy is known and used for identifying organic compounds and examining the biochemical composition of a biological sample (tissue or fluid).

Processes such as leukemogenesis can cause overall changes in the cell biochemistry, leading to differences in the absorption spectra when they are analyzed by FTIR spectroscopy techniques. Consequently, the FTIR spectroscopy is commonly used to distinguish between a normal tissue and an abnormal tissue, by analyzing changes in the absorption bands of macromolecules such as fats, proteins, carbohydrates and nucleic acids.

Furthermore, the teaching of the application WO2011121588 is known from the prior art, which describes a method and a system for detecting and monitoring a blood cancer. More particularly, the inventors named in this application have identified that the samples of mononucleate cells obtained from leukemia patients produce FTIR spectra which differ from those of healthy controls and non-cancer patients suffering clinical symptoms which are similar to leukemia, for example subjects suffering from a fever, thus allowing a differential diagnosis of leukemia patients. By distinguishing the leukemia patients, the patients exhibiting clinical symptoms similar to leukemia, and healthy control subjects, the IR spectroscopy provides an effective diagnosis tool for diagnosing leukemia and/or other types of hematological malignancies.

However, although this document shows the use of FTIR spectroscopy in the context of leukemia diagnosis, this document does not provide any tools allowing to refine the diagnosis according to the subtype of pathologies, or to predict a development of the disease.

SUMMARY

There is thus a need to provide a method which makes it possible to refine the detection of the subtype of leukemias, and in particular myeloid leukemias.

BRIEF DESCRIPTION OF THE FIGURES

FIG. 1 is a table showing the synthetic results of the intergroup distinction G0, G1, G2, G3 and G4. G0: Healthy; G1: Low-risk myelodysplastic syndromes; G2: High-risk myelodysplastic syndromes; G3: Secondary acute myeloid leukemia and G4: De novo acute myeloid leukemia.

DETAILED DESCRIPTION

The invention aims to overcome these failings of the prior art.

One of the aims of the invention is to provide a prognosis method which makes it possible to determine, in a simple manner, the prognosis of onset of a blood disorder in an individual.

The invention thus relates to a method for determining, in particular in vitro, the risk for an individual of developing a blood disorder, from a biological sample of said individual, said method comprising the following steps:
  exposing said biological sample to mid-infrared radiation (MIR) of wavelength varying from 4000 cm$^{-1}$ to 400 cm$^{-1}$ to obtain a spectrum characteristic of said sample, said spectrum being processed in order to obtain a spectral signature made up of absorbance peaks characteristic due to their position, or wave number, and their intensity, or absorbance, of the type and the relative concentrations of the various molecules present in said sample;
  comparing said spectral signature obtained in the previous step with one or more reference spectral signatures, said one or more reference spectral signatures being obtained from a reference population of individuals; and
  concluding
    if the intensities of a first group of peaks of the spectral signature of said individual is significantly different from the intensities of these same peaks obtained in the reference spectral signature(s), that the individual is likely to develop a blood disorder,
  the first group of peaks corresponding to the wave numbers of the following first group: 1330 cm$^{-1}$, 1445 cm$^{-1}$, 1478 cm$^{-1}$, 1493 cm$^{-1}$, 1505 cm$^{-1}$, 1507 cm$^{-1}$, 1520 cm$^{-1}$, 1526 cm$^{-1}$, 1544 cm$^{-1}$, 1571 cm$^{-1}$, 1602 cm$^{-1}$, 1668 cm$^{-1}$, 1674 cm$^{-1}$, 1676 cm$^{-1}$, 1697 cm$^{-1}$, and 2852 cm$^{-1}$,
    if not, that the individual is not likely to develop a blood disorder.

The invention is based on the surprising finding, made by the inventors, that the determination of an infrared spectrum of simple blood samples obtained from individuals makes it possible to obtain information relating to the risk of said individual developing a blood disorder.

Spectroscopy is a simple and quick method which does not require any reagents for implementation (other than the suitable material), which makes it possible to obtain information relating to the macromolecular structure of compounds contained in a biological sample. Typically, the infrared spectra (FTIR) are made up of a plurality of absorption bands, each corresponding to specific functional groups associated with cell components such as fats, proteins, carbohydrates and nucleic acids. All physiological modifications occurring in an individual, including carcinogenesis, can lead to overall changes in the metabolism, which will change the absorption spectra when the sample is analyzed by FTIR techniques. Consequently, the FTIR is commonly used to distinguish between a normal tissue and an abnormal tissue, by analyzing changes in the absorption bands of the molecules.

The infrared portion of the electromagnetic spectrum is divided into three regions: near, mid and far infrared, designated with respect to the visible spectrum. Far infrared, extending approximately from 400 to 10 cm$^{-1}$ (1000-25 μm, in practice, spectrum 1000-30 μm), adjoining the microwave region, has a low energy and can be used for rotational spectroscopy. Mid infrared radiation, extending approximately from 4000 to 400 cm-1 (25-2.5 μm, in practice, spectrum 30-1.4 μm), can be used to study the fundamental vibrations of the associated vibrational structure. Near infrared, which is higher energy, extending approximately from 14000 to 4000 cm$^{-1}$ (2.5-0.7 μm, in practice, spectrum 1.4-0.8 μm), can excite the harmonic vibrations. The designations and classifications of these subregions are essentially conventions. In the invention, reference will be made to spectroscopy in the mid infrared range, according to the definition above.

The infrared spectrum of a sample is established by passing an infrared light beam through said sample. Studying the transmitted light indicates the amount of energy absorbed at each wavelength. This can be achieved using a monochromatic beam, with modification of the wavelength over time, or by using a Fourier transform instrument in order to measure all the absorbances simultaneously, by means of interferometry. It is thus possible to produce absorbance or transmittance spectra, and analyze the absorption wavelengths. The analysis of these features reflects the molecular structures of the sample.

This technique functions almost exclusively on the samples having covalent bonds. Simple spectra are obtained from samples having few active bonds in the infrared range, and at high levels of purity. More complex molecular structures lead to more absorption bands, and thus to more complex spectra, but this method is still used for characterizing very complex mixtures.

The method described in the present invention resides in the simplicity of the steps implemented:
- a first step consists in obtaining an infrared spectrum from a biological sample of an individual, and
- the second step consists in comparing the spectrum obtained in the preceding step with one or more reference spectra, in order to conclude the risk, or otherwise, of developing a blood disorder.

In the invention, "blood disorder" means any pathology affecting the components of the blood, and in particular the malignant blood disorders such as leukemia, lymphomas, myelomas, as well as myelodysplastic and myeloproliferative syndromes In the invention, the result of the exposure to the infrared radiation will be processed, in particular by Fourier transform, in order to obtain a spectral signature that is characteristic of a given sample.

More particularly, the focus will be on the following specific wave numbers (inverse of the wavelength): 1330 cm$^{-1}$, 1445 cm$^{-1}$, 1478 cm$^{-1}$, 1493 cm$^{-1}$, 1505 cm$^{-1}$, 1507 cm$^{-1}$, 1520 cm$^{-1}$, 1526 cm$^{-1}$, 1544 cm$^{-1}$, 1571 cm$^{-1}$, 1602 cm$^{-1}$, 1668 cm$^{-1}$, 1674 cm$^{-1}$, 1676 cm$^{-1}$, 1697 cm$^{-1}$, and 2852 cm$^{-1}$, as well as the relative intensity of each of the peaks corresponding to said wave numbers following the Fourier transformation.

Thus, to summarize, a given sample is exposed to mid infrared radiation in order to obtain a spectrum which will be processed by Fourier transform in order to obtain a spectral signature for at least the wave numbers 1330 cm$^{-1}$, 1445 cm$^{-1}$, 1478 cm$^{-1}$, 1493 cm$^{-1}$, 1505 cm$^{-1}$, 1507 cm$^{-1}$, 1520 cm$^{-1}$, 1526 cm$^{-1}$, 1544 cm$^{-1}$, 1571 cm$^{-1}$, 1602 cm$^{-1}$, 1668 cm$^{-1}$, 1674 cm$^{-1}$, 1676 cm$^{-1}$, 1697 cm$^{-1}$, and 2852 cm$^{-1}$.

Once said spectral signature is obtained, it is compared with a reference spectral signature, or a plurality of reference spectral signatures.

Said reference spectral signatures are obtained from reference samples subjected to the same infrared treatment (and Fourier transform) as the sample analyzed. In order for the comparison to be more effective, it is essential that the reference spectral signatures should be obtained from biological samples of the same type (for example blood, serum, plasma, etc.) as the biological sample tested. Thus, by way of example, if a blood sample is tested for an individual, according to the method of the invention, the reference sample(s) will be those obtained from other blood samples.

The reference spectral signatures are obtained from reference individuals who may be either healthy individuals, i.e. individuals who do not have any disease, or individuals who have an illness of which the symptoms are different from those of a blood disorder, as defined in the invention.

A reference individual can also correspond to the individual tested according to the method of the invention, the reference samples having been taken before said individual developed, or was likely to develop, a blood disorder.

During the comparison between the spectral signature of the individual with the reference spectral signatures, the intensity (absorbance) of various peaks corresponding to the above-mentioned wave numbers is compared.

In this comparison, it follows that, if all the intensities of the peaks corresponding to said wave numbers are significantly different (increase or decrease) with respect to the intensity of these same peaks in the reference spectral signatures, then said individual whose sample has been tested according to the method of the invention will be likely to develop a blood disorder. The signature of a given individual is thus made up of a pattern-type structure which is distributed over a set of spectral variables (16 in the present case). A reference signature (healthy or pathological) is thus formed by a "profile", the pattern. For each type of patient, a profile is identified which is specific of the physiological state of the individual. The identification of the physiological state of any individual is thus based on the comparison of this profile (or pattern) with respect to the reference profiles (or patterns). A calculation of distance between the pattern of the individual and the reference pattern(s) makes it possible to allocate said individual to a particular class/category (healthy or ill, for example). The individual will be "classified" according to the reference pattern which is at the shortest distance/the closest in a space of (in this case for example) 16 dimensions.

Thus, on the basis of an FTIR spectrum obtained from a biological sample of blood, or of a sub-product of blood, or of bone marrow, it is possible to determine the risk, in an individual, of developing a malignant blood disorder.

Advantageously, the invention relates to the above-mentioned method, wherein, when the individual is likely to develop a blood disorder, it is furthermore concluded that:
- if the intensities of a second group of peaks of the spectral signature of said individual is significantly different from the intensities of these same peaks obtained in the reference spectral signature(s), that the individual is likely to develop leukemia,
- the second group of peaks corresponding to the wave numbers of the following first group: 3316 cm$^{-1}$, 3283 cm$^{-1}$, 3281 cm$^{-1}$, 3256 cm$^{-1}$, 3118 cm$^{-1}$, 3116 cm$^{-1}$, 1345 cm$^{-1}$, 1343 cm$^{-1}$, 1340 cm$^{-1}$ and 1338 cm$^{-1}$,
- if not, that the individual is likely to develop a myelodysplastic syndrome.

The inventors have demonstrated that, if the first group of peaks, or wave number, makes it possible to determine if an individual is likely to develop a blood disorder, it is possible, by studying a second group of peaks of the spectral signature, and according to the differences obtained, to determine if the individual in question, tested according to the method of the invention, is likely to develop leukemia or a myelodysplastic syndrome.

The myelodysplastic syndromes (MDS) are clonal blood disorders acquired from the medullary hematopoietic stem cells, with excessive proliferation of myeloid progenitors which are differentiated in an abnormal manner (=dysmyelopoiesis). The excessive apoptosis of the precursors results in a production failure and in peripheral cytopenia (=ineffective hematopoiesis).

There are a plurality of classes of these, defined by the WHO (2016) depending on the type and the number of cytopenia, signs of myelodysplasia (morphological abnormalities of the medullary cells), the presence or absence of an excess of blasts.

The development is extended and relatively indolent in 70% of cases, with progressive aggravation of the cytopenia (bone marrow failure). In 30% of cases, the development is quicker and more aggressive towards an acute myeloid leukemia by accumulation of blasts, explaining why the MDS are also referred to as "pre-leukemic states".

According to this embodiment, studying the two first groups of wave numbers of the spectral signature does not make it possible to distinguish MDS said to be "low-risk" from MDS said to be "high-risk" for transition towards secondary leukemia.

In the invention, a distinction is in particular made between two types of leukemia, in particular two types of acute myeloid leukemia—de novo acute myeloid leukemia, and secondary myeloid leukemia.

The de novo leukemias occur spontaneously in patients, and directly, without being detected in the patient prior to the myeloproliferative syndrome. Such leukemias may appear on account of the simultaneous accumulation of abnormalities affecting the cell proliferation and differentiation of myeloid progenitors.

In turn, the secondary acute myeloid leukemias occur following a worsening of a myeloproliferative syndrome, in particular by accumulating genetic abnormalities which inhibit the differentiation of the progenitors.

In an advantageous embodiment, the invention relates to the above-mentioned method, wherein, when the individual is likely to develop a myelodysplastic syndrome, it is concluded that:
  if the intensities of a third group of peaks of the spectral signature of said individual is significantly different from the intensities of these same peaks obtained in the reference spectral signature(s), that the individual is likely to develop a low-risk myelodysplastic syndrome,
  the third group of peaks corresponding to the wave numbers of the following first group: 3060 $cm^{-1}$, 3062 $cm^{-1}$, 3396 $cm^{-1}$, 3384 $cm^{-1}$ and 3052 $cm^{-1}$,
  if not, that the individual is likely to develop a high-risk myelodysplastic syndrome.

By means of the first, second and third groups of peaks of the spectral signatures, it is possible to distinguish the occurrence of a low-risk or high-risk myelodysplastic syndrome.

Advantageously, the invention relates to the method described above, wherein, when the individual is likely to develop leukemia, it is concluded that:
  if the intensities of a fourth group of peaks of the spectral signature of said individual is significantly different from the intensities of these same peaks obtained in the reference spectral signature(s), that the individual is likely to develop a secondary leukemia,
  the fourth group of peaks corresponding to the wave numbers of the following first group: 3270 $cm^{-1}$, 3268 $cm^{-1}$, 3266 $cm^{-1}$, 3264 $cm^{-1}$, 3192 $cm^{-1}$, 3190 $cm^{-1}$, 2850 $cm^{-1}$, 2840 $cm^{-1}$, 1707 $cm^{-1}$, 1705 $cm^{-1}$, 1664 $cm^{-1}$, 1662 $cm^{-1}$, 1633 $cm^{-1}$, 1631 $cm^{-1}$, 1493 $cm^{-1}$, 1491 $cm^{-1}$, 1489 $cm^{-1}$, 1458 $cm^{-1}$, 1456 $cm^{-1}$ and 1256 $cm^{-1}$,
  if not, that the individual will be likely to develop to develop de novo leukemia.

By means of the first, second and fourth groups of peaks of the spectral signatures, it is possible to distinguish the occurrence of a de novo leukemia or a secondary leukemia.

Even more advantageously, the invention relates to the above-mentioned method, wherein said biological sample is a blood plasma sample.

The advantageous biological sample for implementing the invention is blood plasma which can be obtained during a routine blood test.

The blood plasma is the liquid fraction of the blood. It makes up approximately 55% of the blood volume and serves to transport the blood cells, the platelets and the hormones, and other soluble components (proteins, metabolites, hormones, salts, etc.) through the organism.

Advantageously, the invention relates to the above-mentioned method, wherein the spectral signature and the reference spectral signature(s) are obtained via the second derivative of the respective infrared spectroscopy data.

The calculation of the second derivative of each of the spectra is advantageously carried out. Said second derivative improves the resolution of the infrared bands, as well as the distinction of the peaks obtained. The second derivation of the infrared spectra provides a clear improvement with respect to the use of raw spectra (non-derived) for the characterization, and the identification, of compounds contained in a sample.

This processing is carried out using a software generally integrated in the spectrometer.

The invention also relates to the use of a blood plasma sample of an individual for determining, in particular in vitro, the risk of said individual developing a blood disorder, wherein
  if the intensities of peaks corresponding to a first group of wave numbers of a spectral signature obtained, for said sample, by infrared spectroscopy, are significantly different from the intensities of the same peaks obtained from the spectral signature of one or more control individuals, that the individual is likely to develop a blood disorder,
  said first group of wave numbers corresponding to the following wave numbers: 1330 $cm^{-1}$, 1445 $cm^{-1}$, 1478 $cm^{-1}$, 1493 $cm^{-1}$, 1505 $cm^{-1}$, 1507 $cm^{-1}$, 1520 $cm^{-1}$, 1526 $cm^{-1}$, 1544 $cm^{-1}$, 1571 $cm^{-1}$, 1602 $cm^{-1}$, 1668 $cm^{-1}$, 1674 $cm^{-1}$, 1676 $cm^{-1}$, 1697 $cm^{-1}$, and 2852 $cm^{-1}$,
  if not, that the individual is not likely to develop a blood disorder.

Advantageously, the invention relates to the above-mentioned use, wherein, if the individual is likely to develop a blood disorder, and
  if the intensities of peaks corresponding to a second group of wave numbers of a spectral signature obtained, for said sample, by infrared spectroscopy, are significantly different from the intensities of the same peaks obtained from the spectral signature of one or more control individuals, that the individual is likely to develop leukemia, said second group of wave numbers corresponding to the following wave numbers: 3316 cm$^{-1}$, 3283 cm$^{-1}$, 3281 cm$^{-1}$, 3256 cm$^{-1}$, 3118 cm$^{-1}$, 3116 cm$^{-1}$, 1345 cm$^{-1}$, 1343 cm$^{-1}$, 1340 cm$^{-1}$ and 1338 cm$^{-1}$, if not, that the individual is likely to develop a myelodysplastic syndrome.

Even more advantageously, the invention relates to the above-mentioned use, wherein if the individual is likely to develop a myelodysplastic syndrome, if the intensities of peaks corresponding to a third group of wave numbers of a spectral signature obtained, for said sample, by infrared spectroscopy, are significantly different from the intensities of the same peaks obtained from the spectral signature of one or more control individuals, that the individual will be likely to develop a low-risk myelodysplastic syndrome, said third group of wave numbers corresponding to the following wave numbers: 3060 cm$^{-1}$, 3062 cm$^{-1}$, 3396 cm$^{-1}$, 3384 cm$^{-1}$ and 3052 cm$^{-1}$, if not, that the individual will be likely to develop a high-risk myelodysplastic syndrome, and if the individual is likely to develop leukemia, if the intensities of peaks corresponding to a fourth group of wave numbers of a spectral signature obtained, for said sample, by infrared spectroscopy, are significantly different from the intensities of the same peaks obtained from the spectral signature of one or more control individuals, that the individual will be likely to develop a secondary leukemia, said fourth group of wave numbers corresponding to the following wave numbers: 3270 cm$^{-1}$, 3268 cm$^{-1}$, 3266 cm$^{-1}$, 3264 cm$^{-1}$, 3192 cm$^{-1}$, 3190 cm$^{-1}$, 2850 cm$^{-1}$, 2840 cm$^{-1}$, 1707 cm$^{-1}$, 1705 cm$^{-1}$, 1664 cm$^{-1}$, 1662 cm$^{-1}$, 1633 cm$^{-1}$, 1631 cm$^{-1}$, 1493 cm$^{-1}$, 1491 cm$^{-1}$, 1489 cm$^{-1}$, 1458 cm$^{-1}$, 1456 cm$^{-1}$ and 1256 cm$^{-1}$, if not, that the individual will be likely to develop to develop de novo leukemia.

The invention furthermore relates to a computer program product, or software, comprising portions, means or program code instructions for executing the steps of the method as defined above, when said program is executed on a computer.

Advantageously, said program is included in a computer-readable data recording medium. A medium of this kind is not limited to a portable recording medium such as a CD-ROM, but can also be part of a device comprising an internal memory, in a computer (for example RAM and/or ROM), or of an external memory device such as hard disks or USB keys, or a nearby or remote server.

Advantageously, the above-mentioned computer program product or software is designed to allow for the processing of infrared spectra in order to obtain the spectral signature, the comparison of the spectral signature obtained from the biological sample of the individual tested with the reference spectral signatures, or both.

The above-mentioned computer program product or software can also advantageously be used for forming a second derivative of the spectra obtained after the Fourier transform.

The invention will be better understood in the light of the FIGURE and the following examples.

EXAMPLES

Example 1: Classification

Material and Methods
A—Biological Samples

The blood plasmas were isolated by double centrifugation (700 g, 10 min) from whole blood of unwell individuals (n=70) included in the study MYLESYM (ID-RCE 2011-A00271-40) who had given their consent. They were compared with the plasmas of 99 healthy donors recruited within the context of the study HEALTHOX (ClinicalTrials.gov #NCT02789839).

The plasma samples (50 µL) are frozen at −80° C. until being used. Once defrosted at ambient temperature and homogenized using a vortex-type agitator, 5 µL are deposited and spread on a multi-well plate, of 96 positions, made of silica or zinc selenide (ZnSe), materials which are transparent in IR, set to dry for 15 minutes in a sterilizer at 35° C., and analyzed using an MIR spectrophotometer.

Alternatively, the samples (20 µL) can be deposited on a microscope slide and left in the open air for drying for 24 hours.

B—Acquisition of Blood Plasma Samples
Samples n=169 (99 healthy/70 unwell controls)
G0: Healthy (60 women, 39 men),
G1: Low-risk myelodysplastic syndromes: LR-MDS (12 women, 26 men),
G2: High-risk myelodysplastic syndromes: HR-MDS (5 women, 4 men),
G3: Secondary acute myeloid leukemia AML Sec (3 women, 8 men),
G4: De novo acute myeloid leukemia: AML-Novo (9 women, 7 men).

C—LUMOS Microscope (Bruker)

The LUMOS is an autonomous IRTF microscope equipped with an integrated spectrometer. The innovation provided by a motorized crystal allows the system to pass from the Transmission mode to the Reflection and ATR mode without any intervention by the operator, and to measure, in an entirely automated manner, a sample or a background noise, even when the ATR mode is activated. This type of apparatus is suitable for the attenuated total reflectance (ATR) measurements if the samples were deposited on glass slides, a material which is not transparent in mid-infrared.

An analogue to the de Bruker IR Biotyper can also be used. The instrument is driven by software belonging to de Bruker which is OPUS. This type of spectrophotometer makes it possible to easily acquire around one hundred spectra per day, including plate preparation. The infrared spectra are thus connected in "Transmission" mode, the infrared beam passing through the sample, and the multi-well plate which is made of crystalized ZnSe, a material transparent in the mid-infrared range.

In all cases (measurements in reflection or in transmission) the spectral resolution is 4 cm-1 and 64 to 128 scans are averaged. The background noise is measured via an empty well. The "raw" absorption spectra (as they are) are then saved and then exported to Jcamp format ("open" format) using a macro routine under OPUS.

D—Test Quality

In order to evaluate the quality of spectra on the basis of a plurality of parameters: The water vapor, the signal/water ratio, the intensity of the noise, etc. and to identify the aberrant spectra (outliers) which do not meet certain criteria. In order to verify the hydration state of the sample, it is ensured that the Amide I band of the proteins (1650 cm$^{-1}$) is 2 or 3 times greater than the band of (3400 cm$^{-1}$) which essentially reflects the liquid water.

E—Baseline Correction

The variation in the baseline may be caused by a change in the conditions during acquisition, or variations associated with the instrumentation or the environment (for example: temperature).

F—Normalization

With the aim of minimizing the intensity differences of the signal which are not linked to the sample but to the instrumentation, the raw spectra are normalized using an MSC (Multiplicative Scattering Correction) anti-scattering algorithm: this is a spectral correction method (Sun. D-Wet al. 2009).

G—Filtration

This treatment consists in selecting the spectral range of interest depending on the sample. A spectral domain of 3800 to 940 cm$^{-1}$ s fixed on the sample of interest (plasma). On the band 2800 to 1800 cm$^{-1}$, the spectrum is truncated because it does not contain any information of interest for the analyses performed. This contains mainly the contribution of atmospheric $CO_2$, which reflects environmental variations.

H—Second Derivatives

The derivation makes it possible to improve the resolution of spectra, and thus to limit the effects of band overlap. It will be noted that the passage from the raw spectrum to the second derivative reduces the signal-to-noise ratio {Martens H et al. 2002}. The second derivatives of the spectra are calculated using 13 points for the sliding window Savitsky-Golay smoothing.

Analyses of Spectra Data

A—Statistical Methods

1. Non-Supervised Analysis (Descriptive Analysis)

PCA: Principle Component Analysis: This is a first-line analysis, making it possible to understand the data structure and to identify possible spectra referred to as outliers, which exhibit a different spectral profile for technical reasons, for example poor acquisition, or for biochemical reasons.

2. Supervised Analysis (Explanatory Analysis)

PLSR: Regression by the least squares method (Partial Least Squares Regression): This is a statistical method which makes it possible to model the complex relations between quantitative variables observed, referred to as manifest, and latent variables (MIR spectrum).

B—Selection of Variables

The selection of variables by a genetic algorithm or FADA method makes it possible to identify a sub-set of discriminating variables for specifying the types of biochemical markers modified by the pathology (Trevisan J et al. 2014). This has two advantages:

Improving the performance of the model in terms of prediction (Jouan-Rimbaud D et al. 1995).

Improving the interpretation of the models and understanding the system studied.

C—FADA and GLM Algorithms

An LDA/logistical regression analysis makes it possible to identify the most discriminating spectral variables, in this case between the healthy and different groups of unwell subjects. On the bases of these most discriminating variables, a progressive selection is made in order to identify the few variables which allow for the best specificities and selectivities.

D—Prediction Principle

The results of the discriminating analysis tests are conventionally shown in the form of a confusion matrix, to be interpreted as shown below in Table 1.

TABLE 1

| | | Measured (diagnostic) | | Correctly classified |
|---|---|---|---|---|
| | | Positive | Negative | (%) |
| Prediction IR | Positive | TP | FP | PPV = TP/(TP + FP) |
| | Negative | FN | TP | NPV = TN/(TN + FN) |
| | | Se = TP/ (TP + FN) | Sp = TN/ (FP + TN) | |

The numbers in bold represent the CORRECTLY classified samples, and underlined, the INCORRECTLY classified ones.
The PPV and NPV show the classification success percentage
TP: True positive,
TN: True negative,
FN: False negative,
FP: False positive
PPV: the positive predictive value,
NPV: the negative predictive value
Se: Sensitivity,
Sp: Specificity.

The results obtained for this study are shown in the following table 2, and in FIG. 1.

TABLE 2

| TEST | n | Discriminating variables (cm$^{-1}$) | Discriminated groups | Measured | | Se | Sp | Correctly classified (%) |
|---|---|---|---|---|---|---|---|---|
| F1 | 169 | 1330, 1445, 1478, 1493, 1505, 1507, 1520, 1526, 1544, 1571, 1602, 1668, 1674, 1676, 1697, 2852 | prediction | G0 [G1-G4] | 3197 3 | 6 2394 | 0.99 | 0.99 | 99 99 |
| F2 | 137 | 1330, 1478, 1520, 1668, 1697, 2852 | prediction | G0 G1 | 1611 389 | 723 2877 | 0.80 | 0.79 | 69 88 |
| F3 | 153 | 1330, 1445, 1493, 1505, 1507, 1520, 1526, 1571, 1666, 1668, 1674 | prediction | G0 [G1-G3] | 3242 58 | 94 1706 | 0.98 | 0.94 | 97 97 |
| F4 | 115 | 1054, 1056, 1122, 1124, 1493, 1520, 1571, 1602, 1666, 1668, 1674 | prediction | G0 G4 | 3189 11 | 39 561 | 0.99 | 0.93 | 99 98 |

TABLE 2-continued

| TEST | n | Discriminating variables (cm$^{-1}$) | Discriminated groups | | Measured | | Se | Sp | Correctly classified (%) |
|---|---|---|---|---|---|---|---|---|---|
| F5 | 23 | 3270, 3268, 3266, 3264, 3192, 3190, 2850, 2840, 1707, 1705, 1664, 1662, 1633, 1631, 1493, 1491, 1489, 1458, 1456, 1256 | prediction | G3 G4 | 128 272 | 292 708 | 0.32 | 0.70 | 30 72 |
| F6 | 47 | 3060, 3062, 3396, 3384, 3052 | prediction | G1 G2 | 1323 68 | 239 61 | 0.95 | 0.20 | 84 47 |
| F7 | 16 | 1705, 1182, 1174, 1060, 1058, 1056 | prediction | G2 G3 | 191 109 | 186 114 | 0.63 | 0.38 | 51 51 |
| F8 | 146 | 3339, 3384, 3062, 3060, 3052 | prediction | G0 [G1 + G2] | 3194 106 | 156 1444 | 0.96 | 0.90 | 95 93 |
| F9 | 122 | 1668, 1666, 1526, 1507, 1505, 1493 | prediction | G0 [G3 + G4] | 3175 125 | 238 562 | 0.96 | 0.70 | 93 82 |
| F10 | 70 | 3316, 3283, 3281, 3256, 3118, 3116, 1345, 1343, 1340, 1338 | prediction | [G1 + G2] [G3 + G4] | 1376 224 | 364 463 | 0.86 | 0.55 | 79 66 |

This study establishes that the myelodysplastic syndromes and the acute leukemias (de novo or secondary) are accompanied by distinct metabolic changes which are revealed via the specific IVIIR spectral signatures (specific "barcodes"). This opens up interesting possibilities in terms of early and rapid diagnosis for:

The identification of molecules of plasma which could reflect the physiopathology and be significant biomarkers (interpretation of the spectral signatures);

An aid for early detection of myelodysplasias; and

An aid for tracking MDS patients.

Example 2

The files imported under OPUS are then imported and transposed in a matrix using a software written in the R environment:

```
################################################################
# ImportJcamp.R
# Directory (Jcamp files and recording of the Excel file)
rm(list=ls( )) # deletes all the mv̌ ©mory
activeRep <- "~/Documents/Rcore/Rdata/Cancer/"
setwd(activeRep)
#Name of Excel file export?
excelout <- "Mad.xlsx"
#Number of attributes provided
N <- 2
##############################################
#Selection of files of int?r?t
list_files <- list.files(activeRep, pattern=c("dx","JDX"), full.names=TRUE)
#list_files <- list.files(activeRep, full.names=TRUE)
# Number of files
n <- length(list_files)
#Library read JDX
library(readJDX)
#Wave number on a data.frame
NODF <- readJDX(list_files[1])
NODF <- NODF[[4]]
FCE <- data.frame(NODF$x)
 #Addition of empty columns for the attributes
 ATTRIBUTES <- data.frame(c(1:N))
for (i in 1:n) {
  A <- c(1:N)
    ATTRIBUTES <- data.frame(cbind(ATTRIBUTES,A))
}
ATTRIBUTES[c(0:N),c(0:n+1)] <- ""
#The column is named (on data.frame attributes to simplifier apr?s cbind)
names(ATTRIBUTES)[1] <- "Name of the sample"
#Addition of the remainder of the other column (and they are also named on the data.frame)
   for (i in 1:n) {
   ACDF <- readJDX(list_files[i])
   ACDF <- ACDF[[4]]
   FCE <- cbind(FCE,ACDF$y)
    names(ATTRIBUTES)[i+1] <- basename(unlist(strsplit(list_files[i],c(".JDX",".dx"))[1]))
}
```

```
#Inversion lines and columns (=transposition)
FCE <- t(FCE)
ATTRIBUTES <- t(ATTRIBUTES)
#All is regrouped
FCE <- cbind(ATTRIBUTES,FCE)
#Export in Excel format
library(openxlsx)
wb1 <- createWorkbook( )
sheet <- addWorksheet(wb1,sheetName = "Raw data")
writeData(wb1,sheet = "Raw data",FCE,colNames = FALSE,rowNames = TRUE)
saveWorkbook(wb1, excelout)
```

At the end of this program, an Excel file is created, the first tab of which contains the transposed matrix (1 sample=one line) of all the samples to be processed.

The following step consists in calculating the second derivatives of each spectrum, smoothing these derivatives by means of the Savitzky and Golay sliding window routine over 11 or 13 points, then truncating these derivatives in order to keep only the frequency domains relevant for the analysis. The spectral domains retained are, in almost all cases, 3800-2800 cm-1 and 1800-700 cm-1. They are then normalized according to the vector normalization principle (the area of the second derivative is normalized to 1). The matrix of the second derivatives is saved in a second tab of the same Excel file. The following script performs this pre-processing.

```
##########################################################
# Pr√ ©processing.R
#Directiry (Jcamp files and recording of the Excel file)
activeRep <- "~/Documents/Rcore/Rdata/CANCER"
setwd(activeRep)
# Number of attributes
N <- 2
#Truncating (T1>T2>T3>T4)
"T1" <- 3600
"T2" <- 2800
"T3" <- 1800
"T4" <- 700
#Size of the sliding smoothing window
w<-11
#File name
excelout <- "Mad.xlsx"
##################################################################
#########
    #Packages
    library(RcppArmadillo)
    library(prospectr)
    library(tidyverse)
    library(dplyr)
    library(ppls)
    library(openxlsx)
    library(hyperSpec)
    library(plotrix)
    #File import
    Import <- read.xlsx(excelout,colNames = FALSE)
    write.csv(Import,'Import.csv')
    NF <- read.csv('Import.csv')
    file.remove('Import.csv')
    NF <- NF[,-1]
    #Table of attributes (Number of columns depending on the number of attributes)
    MAT.ATTRIBUTES <- data.frame(NF[,1:(N+1)])
    # Data table
    MAT.ABS <- data.frame(NF[,-c(1:(N+1))])
    #Second derivative and smoothing
    P <- (w-1)/2
    LMA <- length(MAT.ABS)
    MAT.D2 <- rbind(MAT.ABS[1,-c(1:P,(LMA-P+1):LMA)],savitzkyGolay(MAT.ABS[-1,],p=3,w,m=2))
    #Normalization of D2
    MAT.D2 <- rbind(MAT.D2[1,],normalize.vector(MAT.D2[-1,]))
    #Truncating D2N
    if(T1 > max(MAT.D2[1,])){
     "RT1" <- 1
     }else{
     RT1 <- which(MAT.D2[1,]<=T1)
     RT1 <- min(RT1)
     }
```

```
  RT2 <- which(MAT.D2[1,]<=T2)
  RT2 <- min(RT2)
  RT3 <- which(MAT.D2[1,]<=T3)
  RT3 <- min(RT3)
  if(T4 < min(MAT.D2[1,])){
   RT4 <- length(MAT.D2[1,])
   }else{
   RT4 <- which(MAT.D2<=T4)
   RT4 <- min(RT4)
  }
  MAT.D2NT <- cbind(MAT.D2[,c(RT1:RT2,RT3:RT4)])
  #Final tables:
  #Table Second derivative, normalized and truncated
  D2NT <- cbind(MAT.ATTRIBUTES,MAT.D2NT)
  #Display of graphics
  pdf(file = "Plot of pre-processing steps.pdf")
  par(mfrow=c(2,1))
  Y1 <- MAT.ABS
  Y1 <- Y1[-1,]
  Y1 <- as.matrix(Y1)
  X1 <- as.vector(as.numeric(MAT.ABS[1,]))
  RawSpectrum <- new("hyperSpec",spc=Y1,wavelength = X1)
  plotspc(RawSpectrum,wl.reverse = TRUE,wl.range = c(T4 ~ T3,T2 ~ T1),xoffset = 990,
     title.args = list (xlab = expression("Wave number " (cm^-1)),main="Raw data"))
  Y2 <- MAT.D2NT
  Y2 <- Y2[-1,]
  Y2 <- as.matrix(Y2)
  X2 <- as.vector(as.numeric(MAT.D2NT[1,]))
  D2Spectrum <- new("hyperSpec",spc=Y2,wavelength = X2)
  plotspc(D2Spectrum,wl.range = c(T4 ~ T3,T2 ~ T1),xoffset = 990,wl.reverse = TRUE,
     title.args = list (xlab = expression("Wave number " (cm^-1)),main="Normalized
truncated derivatives"))
  #Export of plot e=in PNG
  dev.off( )
  #Export in Excel format
  wb <- createWorkbook( )
  RD <- "RawData" # raw data tab
  secD <- "D2Norm" # normalized second derivatives tab
  sheet <- addWorksheet(wb,sheetName = RD)
  sheet2 <- addWorksheet(wb,sheetName = secD)
  writeData(wb,sheet = RD,NF,colNames = F,rowNames = F)
  writeData(wb,sheet = secD,D2NT,colNames = F,rowNames = F)
  saveWorkbook(wb,excelout,overwrite = T)
  #Export D2NT in format .csv for PCA
  colnames(D2NT) <- D2NT[1,]
  write.csv(D2NT,"D2NT.csv")
```

Nota Bene:
these steps can be performed using any kind of calculation software, as the mathematical operations are standard. However, it is important to respect the order in which they are performed.

Some authors prefer to work from raw spectra corrected for scattering (Multiple Scattering Correction or MSC routine). The inventors found better performances when working from second derivatives.

These second derivatives, truncated and normalized, are used for the calibration of predictive models.

The predictive model is based on an analysis of the PLSR type (Partial Least Squares Regression) which makes it possible to identify the most discriminatory spectral variables between the two groups. These variables are ordered according to the number of times they were positively selected over a large number of iterations (usually 100). Manual tests are then carried out in order to reduce, as best as possible, the variables which will have to be taken into account in the predictive model. Each time (for each combination of variables) a confusion matrix is calculated which makes it possible to identify the samples correctly and incorrectly classified.

Once this optimization has been performed, a validation is carried out by predicting samples which did not serve for calibration of the predictive model. The script R, below, makes it possible to perform these tasks.

```
# GA_PLSmultipleRuns.R
rm(list=ls(all=TRUE))
setwd("~/Documents/Rdata/CANCEROPOLE/") # TO BE INFORMED
  experidata <- read.csv("Evolution2D.csv",sep=";",dec=".",header=TRUE)
  savefile <- "CalEvolution2DcumulVarPLS.txt"
  selindiv <- "CalEvolution2D_Xsomes.txt"
#head(data)
library('MASS')
library('class')
library('GA')
library('glm2')
library(xlsx)
```

```
library('pls')
library('ChemometricsWithR')
library('ChemometricsWithRData')
source("~/Documents/Rpackages/routines/init_pop.R")
source("~/Documents/Rpackages/routines/pls_fitness_pop.R")
source("~/Documents/Rpackages/routines/select_pop.R")
source("~/Documents/Rpackages/routines/crossover_pop.R")
numcol <- dim(experidata)
maxcol <- numcol[2]
identite <- experidata[,1]
VarTarget <- experidata[,2]
#TNR90raw <- experidata[,3]
#TNR30raw <- experidata[,4]
#index30 <- experidata[,5]
#index90 <- experidata[,6]
#TNRejaculat <- experidata[,7]
MIR <- experidata[,3:maxcol] # spectra start at COL3
tutu <- dim(experidata)
spectrumsize10pc <- trunc(0.1*tutu[1])
# Data without the target variable : rawData
rawData <- MIR
X <- rawData
XI <- X
XS <- X
# cNames: Names of variables
cln <- colnames(X)
n <- length(cln)
cNames <- t(cbind(1:n,colnames(X)))
# creation data.frame with selection of the index
#plsdata <- data.frame(vary = tnrEjaculat, varx = I(as.matrix(MIR)), row.names = identite)
#attach(plsdata)
# Graphs of results PLSR
 #(RMSEP(apls), legendpos = 'topright')
 #plot(apls, ncomp=3, asp=1, line=TRUE)
 #Sys.sleep(3)
# plot(apls, ncomp = 1, asp = 1, line = TRUE)
# plot(apls, 'loadings', comps = 1, legendpos = 'topleft', xlab = 'wavenumbers')
# abline(h = 0)
# Selection stores up to 100 selections (or runs)
selection <- matrix(0,n,1)
# Y : Target variable
Y <- TargetVar
# PLOT Average spectrum
frame( )
ymin <- min(XI)
ymax <- max(XI)
meanS <- apply(XI,2, mean)
plot(1:n, meanS, type = "l", lwd = 3, col = "blue", ylim = c(ymin, ymax),
     xlab = "Discriminant variables", ylab = "Average Spectrum")
# *********************************************
number_of_runs = 3 # reset to 100
number_of_passes = 7
max_iterations = 10 # reset to 50
pop_size = 100
for (nrun in 1:number_of_runs)
{
 cat("nrun = ",nrun,"\n")
for (pass in 1:number_of_passes)
{
  cat("pass : ",pass,"\n")
  pop = list(pop = NULL, size = pop_size, bits = ncol(X), fitness = NULL, P = 0)
  pop$P = pop$size
  pop$pop = matrix(0, nrow = pop$size, ncol = pop$bits)
  pop$pop = init_pop(pop$size, pop$bits)
  pop$fitness = pls_fitness_pop(pop$pop, X, Y)
  last_idx = length(pop$fitness)
  idx = order(pop$fitness)
  pop$pop = pop$pop[idx,]
  pop$fitness = pop$fitness[idx]
  worst_fitness = pop$fitness[last_idx]
  for (i in 1:max_iterations)
  {
    #cat(" i = ",i,"\n")
    idx_parents = select_pop(pop$P)
    offspring_pop = crossover_pop(pop$pop, idx_parents, pop$bits)
    offspring_fitness = pls_fitness_pop(offspring_pop, X, Y)
```

```
        if (offspring_fitness[1] < worst_fitness)
        {
          pop$pop[last_idx,] = offspring_pop[1,]
          pop$fitness[last_idx] = offspring_fitness[1]
          idx = order(pop$fitness)
          pop$pop = pop$pop[idx,]
          pop$fitness = pop$fitness[idx]
          worst_fitness = pop$fitness[last_idx]
        }
        if (offspring_fitness[2] < worst_fitness)
        {
          pop$pop[last_idx,] = offspring_pop[2,]
          pop$fitness[last_idx] = offspring_fitness[2]
          idx = order(pop$fitness)
          pop$pop = pop$pop[idx,]
          pop$fitness = pop$fitness[idx]
          worst_fitness = pop$fitness[last_idx]
        }
        cat("Pass ", pass," of ", number_of_passes," iteration ",i," of ",max_iterations,"-->"," best = ",pop$fitness[1],"\n")
        #flush.console( )
      }
      idx = which(pop$pop[1,] != 0)
      if (pass == 1)
      {
        best_ever_variables = cNames[,idx]
        best_ever_fitness = pop$fitness[1]
      } else {
        if (pop$fitness[1] <= best_ever_fitness)
        {
          best_ever_variables = cNames[,idx]
          best_ever_fitness = pop$fitness[1]
        }
      }
      X = X[,idx]
      cNames = cNames[,idx]
    }
    best_ever_variables = t(best_ever_variables)
    colnames(best_ever_variables) = c("Index", "Name")
    best_ever_variables
    best_ever_fitness
    variables <- colnames(MIR)
    ind <- rep(0,length(variables))
    for (i in 1:length(best_ever_variables[,2])) {
      id <- which(best_ever_variables[i,2]==variables)
      ind[id] <- 1
    }
    line <- c(best_ever_fitness,trunc(ind))
    white <- matrix(0,nrow=n,ncol=1)
    # Trace of the var discri on the graph *****************
    w <- dim(best_ever_variables)
    bw <- w[1]
    for (bs in 1:bw)
    {
      sel <- as.double(best_ever_variables[bs,1])
      selection[sel,1] <- selection[sel,1]+1.0000
      white[sel,1] <- 1
    }
    gfactor <- (ymax-ymin)/max(selection)
    plot.new( )
    #pdf(filename="TempHisto.pdf", 20, 20)
    plot(1:n, meanS, type = "l", lwd = 3, col = "blue", ylim = c(ymin, ymax),
         xlab = "Discriminant variables", ylab = "Average Spectrum")
    par(bg=NA)
    for (bev in 1:n)
    {
      y2 <- ymin + selection[bev] * gfactor
      segments (bev, ymin, bev, y2, col = "red")
    }
    #dev.off( )
    # MAJ of the selection fr?quences in savefile (file overwritten upon each run)
    cat("nrun = ",nrun,"\n",file = savefile, append=FALSE)
    cat("best fit = ",best_ever_fitness,"\n",file = savefile, append=TRUE)
    for (sf in 1:n)
    {
      cat(substring(cln[sf],2),"\t", selection[sf], file = savefile, fill = TRUE, append=TRUE)
    }
```

```
# MAJ of its individual selections in selindiv
if (nrun==1) {
  cat("Best RMSEP", substring(cln,2), "\n", file = selindiv, fill = FALSE, sep = "\t", append =
FALSE)
}
cat(line,"\n", file = selindiv, fill = FALSE, sep = "\t", append=TRUE)
X <- XS
cln <- colnames(X)
n <- length(cln)
cNames <- t(cbind(1:n,colnames(X)))
}
#savePlot(filename = "TempHistoPlot", type = c("pdf")
```

The results are set out in the form of the second derivative spectrum, identification of markers (discriminant variables) and confusion matrix, as is identified in FIG. 1.

The invention is not limited to the embodiments set out, and other embodiments will appear clearly for a person skilled in the art.

The invention claimed is:

1. A method for determining, in vitro, the risk for an individual of developing a blood disorder, from a biological sample of said individual, said method comprising the following steps:
exposing said biological sample to mid-infrared radiation (MIR) of wavelength varying from 4000 $cm^{-1}$ to 400 $cm^{-1}$ to obtain a spectrum characteristic of said sample;
processing said spectrum using Fourier transform followed by generating a second derivative of the Fourier transform in order to obtain a spectral signature made up of absorbance peaks characteristic due to their position, or wave number, and their intensity, or absorbance, of the type and the relative concentrations of the various molecules present in said sample;
comparing said spectral signature obtained in the previous step with one or more reference spectral signatures, said one or more reference spectral signatures being obtained from a reference population of individuals and being processed using Fourier transform followed by generating a second derivative; and
concluding that:
(i) if the intensities of a first group of peaks of the spectral signature of said individual is significantly different from the intensities of these same peaks obtained in the reference spectral signature(s), that the individual is likely to develop a blood disorder,
the first group of peaks corresponding to the wave numbers of the following first group: 1330 $cm^{-1}$, 1445 $cm^{-1}$, 1478 $cm^{-1}$, 1493 $cm^{-1}$, 1505 $cm^{-1}$, 1507 $cm^{-1}$, 1520 $cm^{-1}$, 1526 $cm^{-1}$, 1544 $cm^{-1}$, 1571 $cm^{-1}$, 1602 $cm^{-1}$, 1668 $cm^{-1}$, 1674 $cm^{-1}$, 1676 $cm^{-1}$, 1697 $cm^{-1}$, and 2852 $cm^{-1}$, and
(ii) if not, that the individual is not likely to develop a blood disorder, and
tracking the individual if the individual is likely to develop a blood disorder.

2. The method according to claim 1, wherein, when the individual is likely to develop a blood disorder, it is furthermore concluded that:

(i) if the intensities of a second group of peaks of the spectral signature of said individual is significantly different from the intensities of these same peaks obtained in the reference spectral signature(s), that the individual is likely to develop leukemia,
the second group of peaks corresponding to the wave numbers of the following first group: 3316 $cm^{-1}$, 3283 $cm^{-1}$, 3281 $cm^{-1}$, 3256 $cm^{-1}$, 3118 $cm^{-1}$, 3116 $cm^{-1}$, 1345 $cm^{-1}$, 1343 $cm^{-1}$, 1340 $cm^{-1}$ and 1338 $cm^{-1}$, and
(ii) if not, that the individual is likely to develop a myelodysplastic syndrome.

3. The method according to claim 2, wherein, when the individual is likely to develop a myelodysplastic syndrome, it is furthermore concluded that:
(i) if the intensities of a third group of peaks of the spectral signature of said individual is significantly different from the intensities of these same peaks obtained in the reference spectral signature(s), that the individual is likely to develop a low-risk myelodysplastic syndrome,
the third group of peaks corresponding to the wave numbers of the following first group: 3060 $cm^{-1}$, 3062 $cm^{-1}$, 3396 $cm^{-1}$, 3384 $cm^{-1}$ and 3052 $cm^{-1}$, and
(ii) if not, that the individual is likely to develop a high-risk myelodysplastic syndrome.

4. The method according to claim 2, wherein, when the individual is likely to develop leukemia, it is concluded that:
(i) if the intensities of a fourth group of peaks of the spectral signature of said individual is significantly different from the intensities of these same peaks obtained in the reference spectral signature(s), that the individual is likely to develop a secondary leukemia,
the fourth group of peaks corresponding to the wave numbers of the following first group: 3270 $cm^{-1}$, 3268 $cm^{-1}$, 3266 $cm^{-1}$, 3264 $cm^{-1}$, 3192 $cm^{-1}$, 3190 $cm^{-1}$, 2850 $cm^{-1}$, 2840 $cm^{-1}$, 1707 $cm^{-1}$, 1705 $cm^{-1}$, 1664 $cm^{-1}$, 1662 $cm^{-1}$, 1633 $cm^{-1}$, 1631 $cm^{-1}$, 1493 $cm^{-1}$, 1491 $cm^{-1}$, 1489 $cm^{-1}$, 1458 $cm^{-1}$, 1456 $cm^{-1}$ and 1256 $cm^{-1}$, and
(ii) if not, that the individual will be likely to develop to develop de novo leukemia.

5. The method according to claim 1, wherein said biological sample is a blood plasma sample.

6. A computer program product comprising portions, means or program code instructions for executing the steps of the method according to claim 1 when said program is executed on a computer.

* * * * *